United States Patent [19]

Matsushita et al.

[11] Patent Number: 4,580,142

[45] Date of Patent: Apr. 1, 1986

[54] THERMAL TRANSFER IMPRESSION SYSTEM

[75] Inventors: Toshihiko Matsushita, Funabashi; Sadao Morishita, Ibaraki, both of Japan

[73] Assignee: Mitsubishi Paper Mills, Ltd., Tokyo, Japan

[21] Appl. No.: 629,497

[22] Filed: Jul. 10, 1984

[30] Foreign Application Priority Data

| | | | |
|---|---|---|---|
| Jul. 12, 1983 | [JP] | Japan | 58-127507 |
| Jul. 14, 1983 | [JP] | Japan | 58-128218 |
| Dec. 22, 1983 | [JP] | Japan | 58-243441 |
| Dec. 22, 1983 | [JP] | Japan | 58-243442 |

[51] Int. Cl.[4] .......................... G01D 15/10; B41J 3/20

[52] U.S. Cl. ................................ 346/1.1; 346/76 PH; 400/120

[58] Field of Search .......................... 346/76 PH, 1.1; 400/120

[56] References Cited

U.S. PATENT DOCUMENTS 4,395,718 7/1983 Murayama et al. .............. 346/135.1

4,427,985 1/1984 Kikuchi ................................ 346/1.1

4,446,467 5/1984 Takiguchi et al. ............. 346/76 PH

FOREIGN PATENT DOCUMENTS 57-150587 6/1982 Japan .................................. 400/120

*Primary Examiner*—E. A. Goldberg
*Assistant Examiner*—Gerald E. Preston
*Attorney, Agent, or Firm*—Cushman, Darby & Cushman

[57] ABSTRACT

Disclosed is a process for thermal transfer impression, which comprises contacting a master image forming substrate sheet with a thermal transfer ink roll comprising as major components a wax, a coloring matter, and a low-melting-point resin, heating said substrate sheet on the side opposite to that in contact with the ink roll to impress a master image on the latter side of said substrate sheet, then bringing the impressed side of said substrate sheet in contact with an image receiving substrate sheet, and passing the resulting assembly through a heating device to transfer the impressed image to said image receiving substrate sheet. Multicolor thermal transfer impression is possible by using an ink roll divided into a plurality of ink sections of different colors.

21 Claims, 4 Drawing Figures

THERMAL TRANSFER IMPRESSION SYSTEM

BACKGROUND OF THE INVENTION

This invention relates to a process for thermal transfer impression and, more particularly, to a thermal transfer impression process in which an impressed image is transferred under application of heat from a thermal transfer ink roll to an image receiving substrate.

A thermal transfer recording system superior in archival quality, indelibility, or solvent resistance of the impressed record has recently begun to come into actual use to compete with the thermosensitive recording system employing a thermal recording device such as thermal printer or thermal facsimile. The so-called thermal transfer recording sheet used in said system comprises a support and a fusible ink layer disposed on one side of the support. In using the thermal transfer recording sheet, it is superposed upon a normal paper sheet so as to bring the ink layer in contact with the latter paper sheet, and, under application of heat from a thermal head such as that of a thermal facsimile, the ink is transferred from the thermal transfer recording sheet to the normal paper sheet to impress a record. In such a use of the thermal recording sheet, the proportion of the area necessary for the thermal transfer recording is extremely small compared with the total area of the sheet and, in addition, the thermal transfer recording sheet once used cannot be re-used, namely, the sheet is no more than a one-time sheet which is disadvantageous also from the standpoint of labor saving.

There are proposals regarding the process for preparing a master sheet for use in hectograph (master sheet for light printing work) capable of duplicating a large number of copies of the impressed image recorded by means of a thermal recording device similar to those described above. As examples, mention may be made of Japanese Patent Application "Kokai" (Laid-open) Nos. 28,892/81, 37,191/81, and 63,258/82. The Patent Application "Kokai" No. 28,892/81 discloses that both the impression by thermosensitive recording and the preparation of a master sheet for hectograph capable of duplicating a plurality of copies of the impressed record can be simultaneously achieved by arranging in order, under a thermosensitive recording sheet impressible with a heating element, a master image forming substrate sheet and a hectograph carbon paper with its thermosensitive transfer ink layer in contact with said substrate sheet. The Patent Application "Kokai" No. 37191/81 discloses that a master sheet for hectograph capable of duplicating a plurality of copies by impression with a heating element can be prepared by arranging under a master image forming substrate sheet a carbon paper for hectograph with its thermosensitive transfer ink layer in contact with said substrate sheet. It is described in the Patent Application "Kokai" No. 63,258/82 that a master sheet for office duplicating can be obtained by superposing a normal paper sheet on a transfer paper sheet comprising a paper sheet coated with an ink composed essentially of a color dye or a colorless leuco dye capable of forming color by reaction with an acidic color developer, a wax, and a binder, then thermally impressing on the side of said normal paper sheet to transfer the ink image to the normal paper sheet.

In the above proposals, it is intended to produce a master image by using a hectocarbon paper sheet or a transfer paper sheet and a thermosensitive recording device and to obtain a plurality of duplicated copies (prints) by using the resulting master sheet and a fluid duplicator (spirit press). The hectocarbon paper or the transfer paper is also a one-time type like the thermal transfer recording sheet previously mentioned. It is, moreover, a coated paper sheet comprising a base sheet coated with a composition to be transferred to a receiving substrate and, hence, requires coating operation in its production.

This invention further relates to a process for thermal transfer impression of the multicolor type. More particularly, it relates to a process for thermal transfer multicolor impression, in which an impressed image is transferred by applied heat from a thermal transfer ink roll to an image receiving substrate sheet. The thermal transfer recording in single color, e.g. black, has already been put into practice and the developmental effort has been shifted from monochrome to multicolor which has begun to come into actual use, as will be found also in various patent literature such as, for example, Japanese Patent Application "Kokai" (Laid-open) Nos. 182,488/82, 182,489/82, and 182,490/82. The Patent Application "Kokai" No. 182,488/82 discloses a thermal transfer sheet comprising a substrate sheet coated with a thermal transfer ink layer composed of portions of primary colors, red, blue and yellow, and one black ink portion for each set of three primary colors. In the Patent Application "Kokai" No. 182,489/82, the ink layer is composed of a set of different colors, each of which occupies an area which depends on the frequency of use of each color. In the Patent Application "Kokai" No. 182,490/82, a plurality of different colors are arranged along the secondary scanning direction. In using the thermal transfer recording sheets disclosed in the above patent documents, the sheet should be adjusted in accordance with the color to be transferred. For such registering purpose the recording unit and the driving unit for conveyance become complicated. Another disadvantage is the difficulty of increasing the speed of recording.

To solve the above problems, the present inventors carried out an extensive study and, as a result, achieved the invention of an impression process which permits thermal transfer by the application of heat using a thermal transfer ink roll.

BRIEF EXPLANATION OF THE DRAWINGS

In FIG. 1, 1 is thermal transfer ink roll; 2 master image forming substrate; 3 thermal head or laser; 4 master image; 5 image receiving substrate sheet; 6 and 7 hot rolls; and 8 impressed image.

SUMMARY OF THE INVENTION

Figure 1:
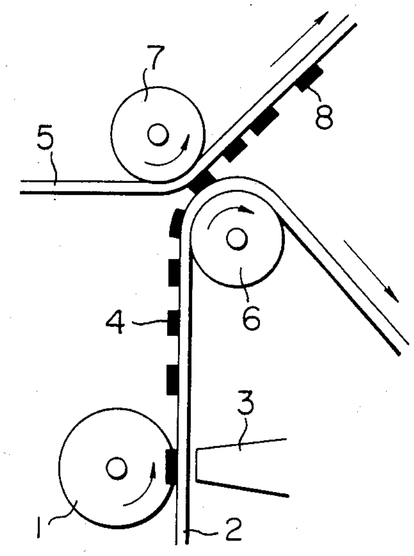
FIG. 1 is a schematic cross-sectional view illustrating the present process for thermal transfer impression.

This invention provides a process for thermal transfer impression, which comprises contacting a master image forming substrate sheet with a thermal transfer ink roll comprising as major components a wax, a coloring matter, and a low-melting resin, heating said substrate sheet on the side opposite to that in contact with the ink roll to impress a master image on the latter side of said substrate sheet, then bringing the impressed side of said substrate sheet in contact with an image receiving fresh substrate sheet, and passing the resulting assembly of sheets through a heating device to transfer the impressed image to said fresh substrate.

The present inventors further accomplished the invention of an impression process whereby multicolor thermal transfer is achieved by the application of heat using a thermal transfer ink roll. According to this invention, there is provided a process for thermal transfer multicolor impression, which comprises contacting a master image forming substrate sheet with a thermal transfer ink roll divided, in cross-section, into a plurality of fusible ink sectors of different colors to impress a master image on the latter side of said substrate sheet, then bringing the impressed side of said substrate sheet in contact with an image receiving sheet, and passing the resulting assembly of sheets through a heating device to transfer the impressed image to said image receiving sheet.

DESCRIPTION OF THE INVENTION

The thermal transfer impression process of the present invention employing a thermal transfer ink roll comprising a fusible ink composed essentially of a wax, a coloring matter, and a low-melting resin has an advantage of dispensing with one-time materials such as a thermal transfer recording sheet prepared by coating a substrate sheet.

Another advantage of the thermal transfer ink roll used in this invention is that once a single roll is set in a thermal recording unit, a large number of impressed records can be made without frequent exchange of the roll.

An advantage of the present process for multicolor thermal transfer impression is such that multicolor recording by thermal transfer becomes possible by the use of a thermal transfer ink roll divided into multiple portions of fusible inks of different colors.

The application of heat to the side of an image forming substrate sheet opposite to the side in contact with a thermal transfer ink roll according to this invention can be performed in various ways, but it is preferable to employ a thermal head or a laser beam. In using a thermal head for heating, the amount of fusible ink transferred to the master image forming sheet can be varied by varying the heat capacity of the thermal head, that is, pulse width. This is an advantage of the thermal head, because an impressed image having a gradation is easily obtained. When a thermal head is used in the present process for thermal transfer multicolor impression, not only a gradation is gained by the control of the heat capacity, that is, the pulse width, whereby the amount of fusible ink transferred to the master image forming sheet is controlled, but also elaborate and sharp recording in multicolor is obtained.

The laser beam as heating means is advantageous for the speed-up of recording, because in the recording system involving a thermal head having a heat generating element, the rate of recording depends on the rate of heat dissipation from the thermal head, whereas no such a restricting factor is present in the case of laser beam. Moreover, since the amount of fusible ink transferred to a master image forming sheet can be varied by the suitable scanning with a laser beam of high energy density, an impressed image having a gradation can easily be obtained. This is an advantage of the laser beam. The lasers suitable for use in the present process are carbon dioxide laser, YAG (yttrium-aluminum-garnet) laser, ruby laser, helium-cadmium laser, helium-neon laser, and argon ion laser.

The thermal transfer ink roll can be composed of single fusible ink or divided into sections of a plurality of inks of different colors. Although the color of ink is subject to no restriction, examples of preferred colors are magenta, cyan, yellow and black. Preferred embodiments of thermal transfer ink rolls used in multicolor recording include a roll divided into 3 sections of cyan, magenta, and yellow fusible inks and a roll divided into 4 sections of cyan, magenta, yellow and black.

As examples of devices for heating the superposed pair of impressed substrate sheet and the image receiving sheet, mention may be made of hot rolls, thermal head, infrared lamp, and flash-type UV lamp. These devices are used each alone or in combinations. Hot rolls as heating equipment are preferably coated with fluoro-carbon polymers or silicones. The heating equipment should be used at a temperature higher than the melting point of the fusible ink being used, because heating at a lower temperature is ineffective.

When an image receiving substrate sheet made of a heat resistant and anti-abrasive material is used to prevent the sheet from sticking to the thermal head which comes into contact with the backside of the sheet, it is possible to make the substrate sheet in endless form for the purpose of labor saving.

The fusible ink consists essentially of a wax, coloring matter, and low-melting-point resin. Examples of suitable waxes are paraffin wax, microcrystalline wax, beeswax, spermaceti, shellac, carnauba wax, candelilla wax, montan wax, and low-molecular-weight polyethylene wax. As coloring matters, use may be made of conventional inorganic or organic pigments or dyes of the desired color such as, for example, magenta, cyan, or yellow. As examples of low-melting resins, there may be mentioned ethylene-vinyl acetate copolymer, ethylene-acrylate copolymer, butadiene-styrene copolymer, vinyl acetate-vinyl chloride copolymer, polyvinyl acetate, rosin, rosin derivatives, and petroleum resin. There is no harm in using the above major constituents in admixture with a softener such as, for example, oleic acid, caster oil, dioctyl phthalate, liquid paraffin, or mineral oil.

As the master image forming substrates, there may be used paper sheets such as, for example, wood free paper, tissue paper, condenser paper, and glassine paper and plastic films such as, for example, polyester, nylon, polystyrene, polypropylene, polycarbonate, polyvinyl chloride, polyvinyl acetate, polyimide, and "Teflon". Plastic films are suitable particularly when the substrate sheet is used in endless form. In order to facilitate the heat transfer from the thermal head to the thermal transfer ink roll, the substrate sheet should be as thin as possible, preferably 5 to 50 $\mu m$ in thickness. When a plastic film in endless form is used, the plastic material should have been imparted with antitackiness, heat resistance, and abrasion resistance. As for the image receiving substrate, it is generally preferable to use normal paper having a high smoothness or the same material as the master image forming substrate.

Thus, according to the present process for thermal transfer impression, the thermal impression is performed by means of a thermal head or a laser beam using a thermal transfer ink roll without the use of conventional thermal transfer recording sheet and continuously for a long period of time without frequent exchange of the ink roll. It is further possible to produce an impressed image of excellent gradation by varying the heat capacity of the thermal head, that is, pulse width or the energy density of a laser beam. When a master image forming substrate sheet in endless form is used, the process will contribute to the labor saving. The practical merit of the present invention is believed to be considerable.

In the present process for thermal transfer multicolor impression, the multicolor impression can also be performed by arranging in series the thermal transfer ink rolls of cyan, magenta, yellow, and black, providing a thermal head for each ink roll, and thermally impressing in desired color. A portion of ink roll in intermediate color tone can be added to the ink roll divided in 3 or 4 portions of different colors. According to the present multicolor impression process, the thermal impression is performed by means of a thermal head or a laser beam using a thermal transfer ink roll without the use of conventional thermal transfer recording sheet and continuously for a long period of time without frequent exchange of the ink roll. It is further possible to produce an impressed image in multicolor with excellent gradation, elaborateness, and sharpness by varying the heat capacity of the thermal head, that is, pulse width, or the energy density of the laser beam.

The present thermal transfer impression process is illustrated below with reference to accompanying drawings.

FIG. 1 is a schematic cross-sectional view illustrating an example of the embodiment of the present process for thermal transfer impression. As shown in FIG. 1, when a master forming substrate sheet 2 is thermally impressed on the side opposite to the side in contact with thermal transfer ink roll 1 by means of thermal head or laser 3, the ink on the thermal transfer ink roll is transferred to said substrate sheet, thereby forming a master image 4. The master image-bearing substrate sheet and an image receiving substrate sheet 5 are brought into superposition so that the side bearing the master image may contact with the image receiving substrate sheet. Both sheets in superposition are then passed through the rolls 6 and 7 set at a temperature higher than the melting point of the fusible ink, whereby the master image is transferred to the image receiving substrate sheet, forming an impression 8. After passing through the hot rolls, the master image forming substrate sheet separates from the image receiving sheet at a wide angle. This is necessary and important for the perfect transfer of the master image to the image receiving substrate sheet. Thus, the impression by the thermal head can form an impressed image on the image receiving sheet. Although in the above example both rolls 6 and 7 are set at a temperature higher than the melting point of the fusible ink, it is possible to heat either one. It is also possible to replace either one of the hot rolls 6 and 7 by a thermal head, infrared lamp, or flash-type UV lamp and replace the other one by a platen cylinder. Combinations of the above cases are also possible.

In the above impression procedure, description is given with respect to the recording in monochrome, e.g. yellow. As shown in the schematic cross-sectional view of the thermal transfer ink roll (FIG. 2), when a record in cyan color is desired, the ink roll is rotated by a central angle of 120° . Likewise, an impression in magenta color can be performed. An impressed record in multicolor is obtained by performing the impression in monochrome and mixed color. Thus, the impression by the thermal head can form an impressed image in multicolor on the image receiving substrate sheet.

Figure 2:
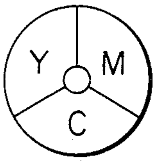
FIG. 2 is a schematic cross-sectional view illustrating a thermal transfer ink roll divided into 3 sectors of C (cyan), M (magenta) and Y (yellow).
Figure 3:
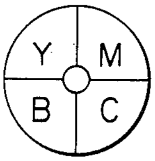
FIG. 3 is a schematic cross-sectional view of a thermal transfer ink roll divided into 4 sectors of C (cyan), M (magenta), Y (yellow) and B (black).
Figure 4:
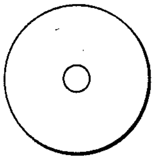
FIG. 4 is a schematic cross-sectional view illustrating a thermal transfer ink roll for use in the process for thermal transfer impression of single color (monochrome color), that is, an undivided ink roll.

Two types of thermal transfer ink rolls for use in multicolor recording are shown in FIGS. 2 and 3. FIG. 2 is a schematic cross-sectional view of an ink roll divided into 3 sections of cyan, magenta, and yellow fusible inks. FIG. 3 is a schematic cross-sectional view of an ink roll divided into 4 sections of cyan, magenta, yellow, and black fusible inks.

What is claimed is:

1. A process for thermal transfer impression, which comprises contacting a master image forming substrate sheet with a thermal transfer ink roll comprising as major components a wax, a coloring matter, and a low-melting-point resin, heating said substrate sheet on the side opposite to that in contact with the ink roll to impress a master image on the latter side of said substrate sheet, then bringing the impressed side of said substrate sheet in contact with an image receiving substrate sheet, and passing the resulting assembly through a heating device to transfer the impressed image to said image receiving substrate sheet.

2. A process according to claim 1, wherein the thermal transfer ink roll comprises a single fusible ink.

3. A process according to claim 1, wherein the thermal transfer ink roll is divided into a plurality of fusible ink sections of different colors.

4. A process according to claim 3, wherein the thermal transfer ink roll is divided into three sections of cyan, magenta, and yellow fusible inks.

5. A process according to claim 3, wherein the thermal transfer ink roll is divided into four sections of cyan, magenta, yellow, and black fusible inks.

6. A process according to claim 1 wherein the master image forming substrate sheet is heated by means of a thermal head on the side opposite to that in contact with the ink roll.

7. A process according to claim 1 wherein the master image forming substrate sheet is heated by means of a laser beam on the side opposite to that in contact with the ink roll.

8. A process according to claim 1, wherein the heating device is at least one of the hot roll, thermal head, infrared lamp, and flash-type UV lamp.

9. A process according to claim 1, wherein the master image forming substrate sheet is in an endless form.

10. A process according to claim 1, wherein the master image forming substrate sheet is a plastic film.

11. A process according to claim 1, wherein the thickness of the master image forming substrate sheet is from about 5 to about 50 $\mu$m.

12. A process according to claim 1, wherein the image receiving substrate sheet is a highly smooth normal paper sheet.

13. An equipment for thermal transfer impression comprising a master image forming substrate sheet; a thermal transfer ink roll in contact with said substrate sheet to transfer an ink to said substrate sheet to form a master image thereon when thermal impression is performed on the contact surface; a heat supplying means to perform thermal impression on the side of said substrate sheet opposite to the contact side; and a heating device to supply heat to said substrate sheet with the master image-bearing side in contact with an image receiving substrate sheet, thereby to transfer the master image to the latter sheet.

14. An equipment according to claim 13, wherein the thermal transfer ink roll comprises a single fusible ink.

15. An equipment according to claim 13, wherein the thermal transfer ink roll is divided into a plurality of fusible ink sections of different colors.

16. An equipment according to claim 15, wherein the thermal transfer ink roll is divided into three sections of cyan, magenta, and yellow fusible inks.

17. An equipment according to claim 15, wherein the thermal transfer ink roll is divided into four sections of cyan, magenta, yellow, and black fusible inks.

18. An equipment according to claim 13, wherein the heating of the master image forming substrate sheet on the side opposite to that in contact with the ink roll is performed by means of a thermal head.

19. An equipment according to claim 13, wherein the heating of the master image forming substrate sheet on the side opposite to that in contact with the ink roll is performed by means of a laser beam.

20. An equipment according to claim 13, wherein the heating device is at least one of the hot roll, thermal head, infrared lamp, and flash-type UV lamp.

21. An equipment according to claim 13, wherein the master image forming substrate sheet is fed endlessly.

* * * * *